United States Patent
Weber et al.

(10) Patent No.: US 9,296,872 B2
(45) Date of Patent: Mar. 29, 2016

(54) THERMOPLASTIC MOLDING COMPOSITION MADE OF POLYARYLENE ETHERS AND POLYPHENYLENE SULFIDE WITH IMPROVED PROCESSING STABILITY

(75) Inventors: Martin Weber, Maikammer (DE);
Christian Maletzko, Altrip (DE);
Florian Hennenberger, Heppenheim (DE)

(73) Assignee: BASF SE, Ludwigshafen (DE)

( * ) Notice: Subject to any disclaimer, the term of this patent is extended or adjusted under 35 U.S.C. 154(b) by 701 days.

(21) Appl. No.: 13/473,022

(22) Filed: May 16, 2012

(65) Prior Publication Data

US 2012/0296028 A1 Nov. 22, 2012

Related U.S. Application Data

(60) Provisional application No. 61/685,889, filed on May 18, 2011.

(51) Int. Cl.

| | |
|---|---|
| *C08L 71/12* | (2006.01) |
| *C08L 71/10* | (2006.01) |
| *C08L 81/06* | (2006.01) |
| *C08K 3/04* | (2006.01) |
| *C08K 7/24* | (2006.01) |
| *C08K 7/14* | (2006.01) |
| *C08K 7/02* | (2006.01) |
| *C08L 81/04* | (2006.01) |
| *C08G 65/40* | (2006.01) |
| *C08L 71/08* | (2006.01) |
| *C08L 81/02* | (2006.01) |
| *C08G 75/14* | (2006.01) |
| *C08G 75/02* | (2006.01) |
| *C08G 75/12* | (2006.01) |
| *C08K 5/06* | (2006.01) |

(52) U.S. Cl.
CPC ... *C08K 3/04* (2013.01); *C08K 7/02* (2013.01); *C08K 7/14* (2013.01); *C08K 7/24* (2013.01); *C08L 71/10* (2013.01); *C08L 71/12* (2013.01); *C08L 81/06* (2013.01); C08G 65/40 (2013.01); C08G 65/4006 (2013.01); C08G 75/0204 (2013.01); C08G 75/0209 (2013.01); C08G 75/0213 (2013.01); C08G 75/0218 (2013.01); C08G 75/0227 (2013.01); C08G 75/12 (2013.01); C08G 75/14 (2013.01); C08K 5/06 (2013.01); C08L 71/08 (2013.01); C08L 71/123 (2013.01); C08L 71/126 (2013.01); C08L 81/02 (2013.01); C08L 81/04 (2013.01)

(58) Field of Classification Search
CPC .............. C08K 3/04; C08K 7/02; C08K 7/14; C08K 7/24; C08L 71/08; C08L 71/10; C08L 71/12; C08L 71/123; C08L 71/126; C08L 81/06; C08L 81/02; C08L 81/04; C08G 65/40; C08G 65/4006; C08G 75/0213; C08G 75/0218; C08G 75/12; C08G 75/14; C08G 75/0204; C08G 75/0227; C08G 75/0209
USPC ................. 524/847, 424, 495, 496, 390, 480; 525/480, 534, 535, 537
See application file for complete search history.

(56) References Cited

U.S. PATENT DOCUMENTS

| | | | |
|---|---|---|---|
| 2,513,188 | A | 6/1950 | Macallum |
| 3,354,129 | A | 11/1967 | Edmonds et al. |
| 3,699,087 | A | 10/1972 | Wood et al. |
| 4,160,813 | A | 7/1979 | Markel et al. |
| 4,645,826 | A | 2/1987 | Iizuka et al. |
| 5,502,122 | A | 3/1996 | Weber et al. |
| 2007/0235893 | A1 * | 10/2007 | Miyoshi ...................... 264/105 |
| 2011/0178205 | A1 | 7/2011 | Weber et al. |
| 2011/0218294 | A1 | 9/2011 | Weber et al. |
| 2011/0237694 | A1 | 9/2011 | Weber et al. |

(Continued)

FOREIGN PATENT DOCUMENTS

| | | |
|---|---|---|
| EP | 185237 A1 | 6/1986 |
| EP | 673973 | 9/1995 |

(Continued)

OTHER PUBLICATIONS

U.S. Appl. No. 13/376,901.
U.S. Appl. No. 61/424,686.
U.S. Appl. No. 13/457,682.
U.S. Appl. No. 13/391,082.
U.S. Appl. No. 13/504,717.
U.S. Appl. No. 13/053,872, filed Mar. 22, 2011, Weber et al.
Translation of EP0855428 (filed May 16, 2012).
Translation of EP0903376 (filed May 16, 2012).

*Primary Examiner* — Ling Choi
*Assistant Examiner* — David L Miller
(74) *Attorney, Agent, or Firm* — Drinker Biddle & Reath LLP

(57) ABSTRACT

The present invention relates to a thermoplastic molding composition which comprises the following components:
A) from 10 to 50% by weight of at least one polyarylene ether having an average of at most 0.5 phenolic end groups per polymer chain and having no carboxy groups,
B) from 5 to 44.5% by weight of at least one polyphenylene sulfide,
C) from 10 to 65% by weight of at least one fibrous and/or particulate filler,
D) from 0.5 to 20% by weight of an elastic graphite,
E) from 0 to 20% by weight of at least one polyarylene ether comprising carboxy groups,
F) from 0 to 20% by weight of at least one polyarylene ether having an average of at least 1.5 phenolic end groups per polymer chain and having no carboxy groups, and
G) from 0 to 40% by weight of at least one additive
where the sum of the proportions by weight of components A) to G) is 100% by weight, based on the molding composition.

13 Claims, No Drawings

(56) References Cited

U.S. PATENT DOCUMENTS

| | | |
|---|---|---|
| 2011/0244743 A1 | 10/2011 | Scherzer et al. |
| 2011/0294912 A1 | 12/2011 | Weber et al. |
| 2012/0083541 A1 | 4/2012 | Khvorost et al. |
| 2012/0083579 A1 | 4/2012 | Weber et al. |
| 2012/0088048 A1 | 4/2012 | Scherzer et al. |
| 2012/0153232 A1 | 6/2012 | Gibon et al. |
| 2012/0153233 A1 | 6/2012 | Gibon et al. |
| 2012/0181487 A1 | 7/2012 | Gibon et al. |

FOREIGN PATENT DOCUMENTS

| | | |
|---|---|---|
| EP | 855 428 A1 | 7/1998 |
| EP | 903 376 A2 | 3/1999 |
| GB | 962941 A | 7/1964 |
| GB | 2 113 235 A | 8/1983 |
| WO | WO-2011/009798 A1 | 1/2011 |

* cited by examiner

THERMOPLASTIC MOLDING COMPOSITION MADE OF POLYARYLENE ETHERS AND POLYPHENYLENE SULFIDE WITH IMPROVED PROCESSING STABILITY

CROSS-REFERENCE TO RELATED APPLICATIONS

This application claims benefit (under 35 USC 119(e)) of U.S. Provisional Application 61/685,889, filed May 18, 2011, which is incorporated by reference.

The present invention relates to a thermoplastic molding composition which comprises the following components:

A) from 10 to 50% by weight of at least one polyarylene ether having an average of at most 0.5 phenolic end groups per polymer chain and having no carboxy groups,
B) from 5 to 44.5% by weight of at least one polyphenylene sulfide,
C) from 10 to 65% by weight of at least one fibrous and/or particulate filler,
D) from 0.5 to 20% by weight of an elastic graphite,
E) from 0 to 20% by weight of at least one polyarylene ether comprising carboxy groups,
F) from 0 to 20% by weight of at least one polyarylene ether having an average of at least 1.5 phenolic end groups per polymer chain and having no carboxy groups, and
G) from 0 to 40% by weight of at least one additive where the sum of the proportions by weight of components A) to G) is 100% by weight, based on the molding composition.

The present invention further relates to the use of the thermoplastic molding composition as coating composition and for producing fibers, foils, or moldings, and also to fibers, foils, or moldings comprising this thermoplastic molding composition.

Preferred embodiments can be found in the claims and in the description. The scope of the present invention includes combinations of preferred embodiments.

The demand for high-performance thermoplastics is of increasing interest, and there is a particular need for molding compositions with high heat resistance, good mechanical processability, and inherent flame retardancy.

Polyarylene ethers feature high heat resistance, good mechanical properties, and inherent flame retardancy.

However, polyarylene ethers are amorphous and therefore sometimes have low resistance to aggressive solvents. Polyarylene ethers also have high melt viscosity, and this particularly impairs processing to give large moldings by means of injection molding. The high melt viscosity is also disadvantageous for production of molding compositions with high filler loading or high fiber loading.

There are known thermoplastic molding compositions made of polyarylene ethers, of polyphenylene sulfides, and of rubber, which according to the description (EP 673 973) have improved flowability and good chemicals resistance. The thermoplastic molding compositions can comprise carbon fibers as additive.

GB A 2 113 235 in turn discloses thermoplastic molding compositions which comprise polyphenylene sulfides and polyarylene ethers having hydroxy groups.

EP 855 428 and EP 903 376 disclose fiber-reinforced polyarylene ethers which comprise rubbers alongside functionalized polyarylene ethers.

The object of the invention consisted in providing a thermoplastic molding composition which has improved processability. In particular, processability in the melt should be improved when fiber loading is high.

The resultant thermoplastic molding composition should moreover feature good mechanical properties, such as tensile strain at break and/or ultimate tensile strength.

The thermoplastic molding composition defined in the introduction has accordingly been discovered.

COMPONENT A

In the invention, the thermoplastic molding composition comprises at least one, but preferably one, polyarylene ether (A) having an average of at most 0.5 phenolic end groups per polymer chain. The expression "an average" here means number average.

The amount of component A) present in the thermoplastic molding compositions of the invention is preferably from 10 to 50% by weight, particularly preferably from 14 to 45% by weight, in particular from 20 to 45% by weight, very particularly preferably from 30 to 45% by weight, where the sum of the proportions by weight of components A) to G) is 100% by weight, based on the molding composition.

It is obvious to the person skilled in the art that the phenolic end groups are reactive and that they can be present at least to some extent in reacted form within the thermoplastic molding compositions. The thermoplastic molding compositions are preferably produced via compounding, i.e. via mixing of the components in a flowable state.

For the purposes of the present invention, a phenolic end group is a hydroxy group bonded to an aromatic ring, and optionally also present in deprotonated form. The person skilled in the art is aware that a phenolic end group can be present in the form of what is known as a phenolate end group by virtue of cleavage of a proton as a result of exposure to a base. The expression phenolic end groups therefore expressly comprises not only aromatic OH groups but also phenolate groups.

The proportion of phenolic end groups is preferably determined via potentiometric titration. For this, the polymer is dissolved in dimethylformamide, and titrated with a solution of tetrabutylammonium hydroxide in toluene/methanol. The end point is determined by a potentiometric method. The proportion of halogen end groups is preferably determined by means of atomic spectroscopy.

The person skilled in the art can use known methods to determine the average number of phenolic end groups per polymer chain ($n^{OH}$), on the assumption of strictly linear polymer chains, using the following formula: $n^{OH} = m^{OH}$ [in % by weight]/$100 \cdot M_n^P$ [in g/mol]$\cdot 1/17$, starting from the proportion by weight of phenolic end groups, based on the total weight of the polymer ($m^{OH}$) and from the number-average molecular weight ($M_n^P$).

As an alternative, the average number of phenolic end groups per polymer chain ($n^{OH}$) can be calculated as follows: $n^{OH} = 2/(1+(17/35.45 \cdot m^{Cl}/m^{OH}))$ on the assumption that the end groups present are exclusively OH groups and Cl groups, and on the assumption of strictly linear polymer chains, if the proportion by weight of Cl end groups ($m^{Cl}$) is simultaneously known. The person skilled in the art knows how to adapt the calculation methods in the event that end groups other than Cl are present.

Production of polyarylene ethers with simultaneous control of end groups is known to the person skilled in the art and is described in more detail at a later stage below. The known polyarylene ethers usually have halogen end groups, in particular —F or —Cl, or phenolic OH end groups or phenolate end groups, where the latter can be present as such or in reacted form, in particular in the form of —$OCH_3$ end groups.

It is preferable that the polyarylene ethers (A) have at most 0.01% by weight, particularly at most 0.005% by weight, of phenolic end groups, based on the amount by weight of component (A).

The respective upper limit for content of phenolic end groups in components (A) is a function of the number of end groups available per molecule (this being two in the case of linear polyarylene ethers) and of the number-average chain length. The person skilled in the art is aware of these calculations.

It is preferable that the average number of phenolic end groups per polymer chain in component (A) is from 0 to 0.2, in particular from 0 to 0.1, particularly preferably from 0 to 0.05, very particularly preferably from 0 to 0.02, with particular preference at most 0.01.

Polyarylene ethers are a class of polymer known to a person skilled in the art. In principle, component (A) used can comprise any of the polyarylene ethers that are known to the person skilled in the art and/or that can be produced by known methods. These methods are explained at a later stage below.

Preferred polyarylene ethers (A) are composed of units of the general formula I

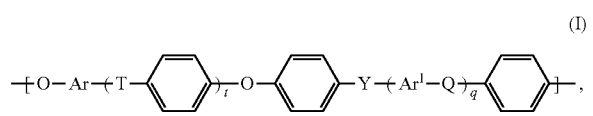

(I)

where the definitions of the symbols t, q, Q, T, Y, Ar and $Ar^1$ are as follows:

t, q: independently of one another 0, 1, 2, or 3,

Q, T, Y: independently of one another in each case a chemical bond or group selected from —O—, —S—, —$SO_2$—, S=O, C=O, —N=N—, and —$CR^aR^b$—, where $R^a$ and $R^b$ independently of one another are in each case a hydrogen atom or a $C_1$-$C_{12}$-alkyl, $C_1$-$C_{12}$-alkoxy, or $C_6$-$C_{18}$-aryl group, and where at least one of Q, T, and Y is —$SO_2$—, and Ar and $Ar^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it is preferable that Q, T, and Y in formula I are selected independently of one another from —O— and —$SO_2$—, with the proviso that at least one of the group consisting of Q, T, and Y is —$SO_2$—.

If Q, T, or Y is —$CR^aR^b$—, $R^a$ and $R^b$ independently of one another are in each case a hydrogen atom or a $C_1$-$C_{12}$-alkyl, $C_1$-$C_{12}$-alkoxy, or $C_6$-$C_{18}$-aryl group.

Preferred $C_1$-$C_{12}$-alkyl groups comprise linear and branched, saturated alkyl groups having from 1 to 12 carbon atoms. The following moieties may be mentioned in particular: $C_1$-$C_6$-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multibranched analogs thereof.

Alkyl moieties that can be used in the abovementioned $C_1$-$C_{12}$-alkoxy groups that can be used are the alkyl groups defined at an earlier stage above having from 1 to 12 carbon atoms. Cycloalkyl moieties that can be used with preference in particular comprise $C_3$-$C_{12}$-cycloalkyl moieties, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are independently of one another a $C_6$-$C_{18}$-arylene group. On the basis of the starting materials described at a later stage below, it is preferable that Ar derives from an electron-rich aromatic substance that is very susceptible to electrophilic attack, preferably selected from the group consisting of hydroquinone, resorcinol, dihydroxynaphthalene, in particular 2,7-di hydroxynaphthalene, and 4,4'-bisphenol. $Ar^1$ is preferably an unsubstituted $C_6$- or $C_{12}$-arylene group.

Particular $C_6$-$C_{18}$-arylene groups Ar and Art that can be used are phenylene groups, e.g. 1,2-, 1,3-, and 1,4-phenylene, naphthylene groups, e.g. 1,6-, 1,7-, 2,6-, and 2,7-naphthylene, and also the arylene groups that derive from anthracene, from phenanthrene, and from naphthacene.

In the preferred embodiment according to formula I, it is preferable that Ar and $Ar^1$ are selected independently of one another from the group consisting of 1,4-phenylene, 1,3-phenylene, naphthylene, in particular 2,7-dihydroxynaphthylene, and 4,4'-bisphenylene.

Preferred polyarylene ethers (A) are those which comprise at least one of the following repeat units Ia to Io:

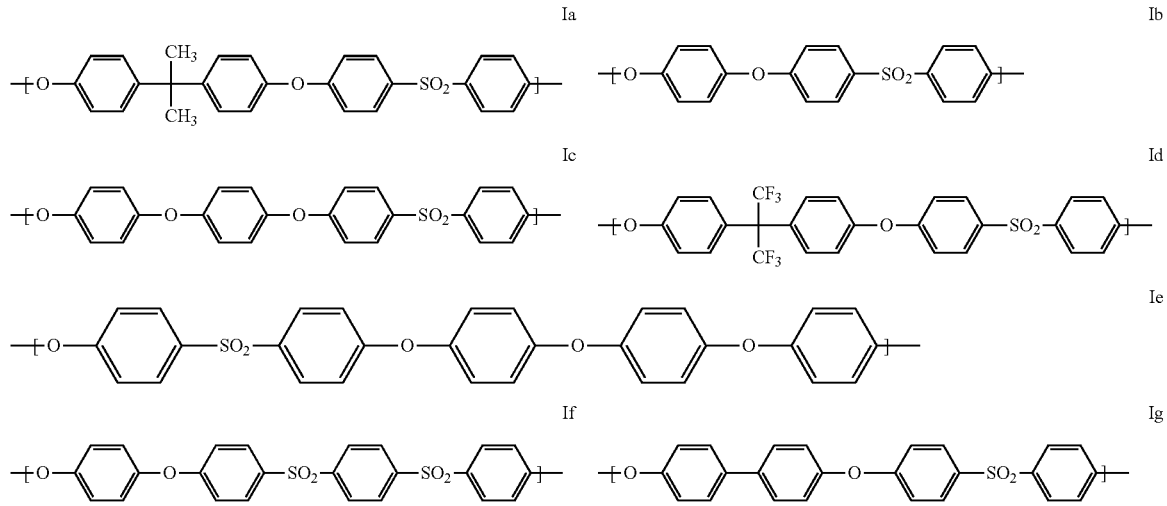

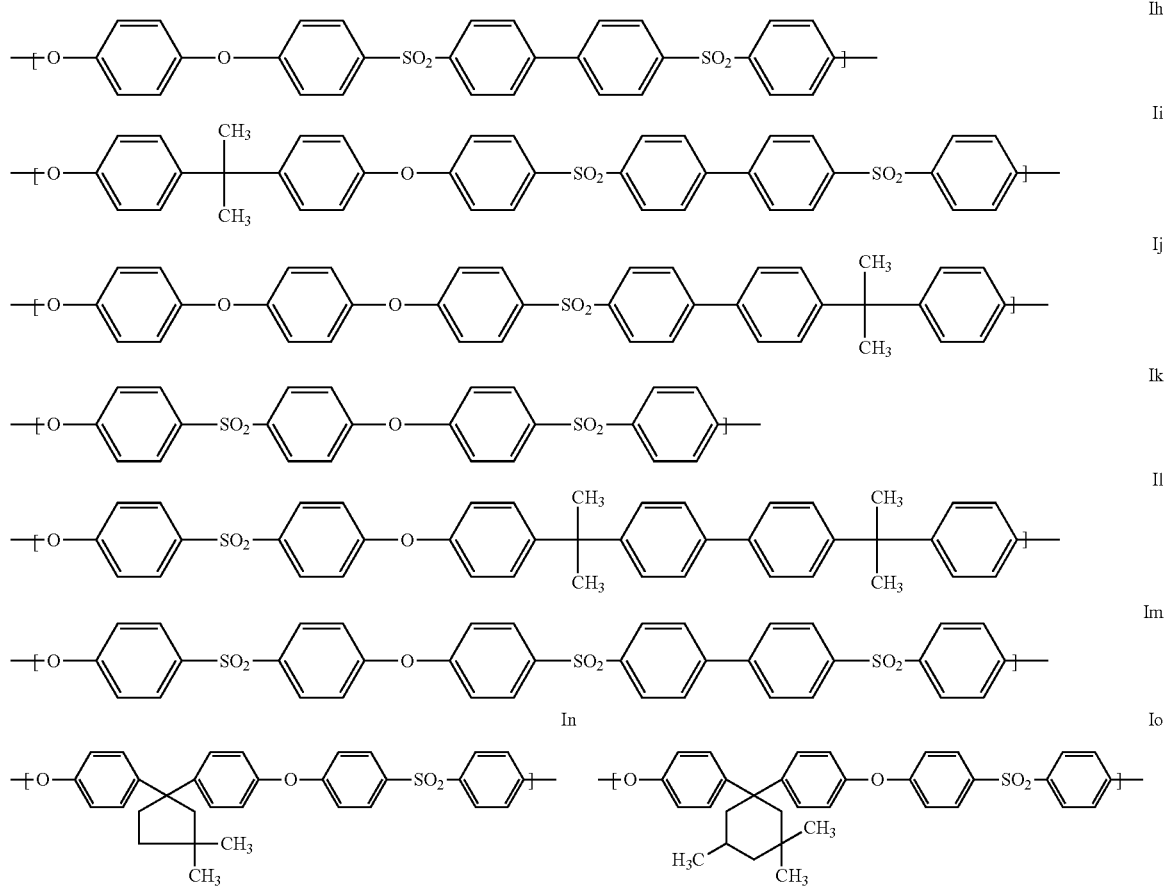

Other preferred units, in addition to the units Ia to that are preferably present, are those in which one or more 1,4-phenylene units deriving from hydroquinone have been replaced by 1,3-phenylene units deriving from resorcinol, or by naphthylene units deriving from dihydroxynaphthalene.

Particularly preferred units of the general formula I are the units Ia, Ig, and Ik. It is also particularly preferable that the polyarylene ethers of component (A) are in essence composed of one type of unit of the general formula I, in particular of one unit selected from Ia, Ig, and Ik.

In one particularly preferred embodiment, Ar=1,4-phenylene, t=1, q=0, T is a chemical bond, and Y=SO$_2$. Particularly preferred polyarylene ether sulfones (A) composed of the abovementioned repeat unit are termed polyphenylene sulfone (PPSU) (formula Ig).

In another particularly preferred embodiment, Ar=1,4-phenylene, t=1, q=0, T=C(CH$_3$)$_2$, and Y=SO$_2$. Particularly preferred polyarylene ether sulfones (A) composed of the abovementioned repeat unit are termed polysulfone (PSU) (formula Ia).

In another particularly preferred embodiment, Ar=1,4-phenylene, t=1, q=0, T=Y=SO$_2$. Particularly preferred polyarylene ether sulfones (A1) composed of the abovementioned repeat unit are termed polyether sulfone (PESU) (formula Ik). This embodiment is very particularly preferred.

For the purposes of the present invention, abbreviations such as PPSU, PESU, and PSU are in accordance with DIN EN ISO 1043-1:2001.

The weight-average molar masses M$_w$ of the polyarylene ethers (A) of the present invention are preferably from 10 000 to 150 000 g/mol, in particular from 15 000 to 120 000 g/mol, particularly preferably from 18 000 to 100 000 g/mol, determined by means of gel permeation chromatography in dimethylacetamide as solvent against narrowly-distributed polymethyl methacrylate as standard.

The apparent melt viscosity at 350° C./1150 s$^{-1}$ of the polyarylene ether (A) is moreover preferably from 150 to 300 Pa s, with preference from 150 to 275 Pa s. Flowability was assessed on the basis of melt viscosity. Melt viscosity was determined by means of a capillary rheometer. Apparent viscosity at 350° C. was determined here as a function of shear rate in a capillary viscometer (Götffert Rheograph 2003 capillary viscometer) using a circular capillary of length 30 mm radius 0.5 mm, an inlet angle of 180° for the nozzle, a diameter of 12 mm for the melt reservoir vessel, and a preheating time of 5 minutes. The values stated were determined at 1150 s$^{-1}$.

Production processes that lead to the abovementioned polyarylene ethers are known per se to the person skilled in the art and are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443.

Particular preference is given to the reaction, in aprotic polar solvents and in the presence of anhydrous alkali metal carbonate, in particular sodium carbonate, potassium carbonate, calcium carbonate, or a mixture thereof, very particularly preferably potassium carbonate, between at least one aromatic compound having two halogen substituents and at least one aromatic compound having two functional groups reactive toward abovementioned halogen substituents. One particularly suitable combination is N-methylpyrrolidone as solvent and potassium carbonate as base.

It is preferable that the polyarylene ethers (A) have either halogen end groups, in particular chlorine end groups, or etherified end groups, in particular alkyl ether end groups, these being obtainable via reaction of the OH or, respectively, phenolate end groups with suitable etherifying agents.

Examples of suitable etherifying agents are monofunctional alkyl or aryl halide, e.g. $C_1$-$C_6$-alkyl chloride, $C_1$-$C_6$-alkyl bromide, or $C_1$-$C_6$-alkyl iodide, preferably methyl chloride, or benzyl chloride, benzyl bromide, or benzyl iodide, or a mixture thereof. For the purposes of the polyarylene ethers of component (A) preferred end groups are halogen, in particular chlorine, alkoxy, in particular methoxy, aryloxy, in particular phenoxy, or benzyloxy.

COMPONENT B

The molding composition of the invention comprises, as component (B), at least one, but preferably one, polyarylene sulfide. In principle, it is possible to use any polyarylene sulfide as component (B).

Preferred amounts of component (B) present in the thermoplastic molding compositions of the invention are from 5 to 44.5% by weight, particularly from 5 to 30% by weight, in particular from 5 to 20% by weight, and very particularly from 10 to 20% by weight, where the sum of the proportions by weight of components A) to G) is 100% by weight, based on the molding composition.

The polyarylene sulfides of component (B) are preferably composed of from 30 to 100% by weight of repeat units according to the general formula —Ar—S—, where —Ar— is an arylene group having from 6 to 18 carbon atoms.

Preference is given to polyarylene sulfides which comprise, based on the total weight of all repeat units, at least 30% by weight, in particular at least 70% by weight, of repeat units II:

(II)

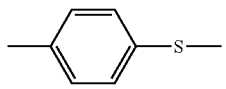

Particularly suitable other repeat units are

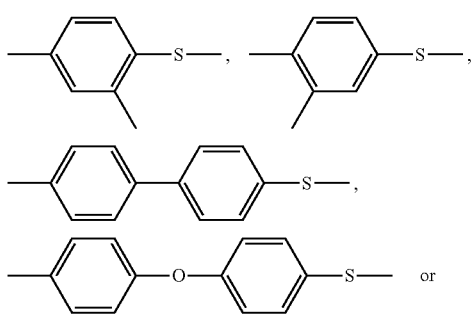

or

-continued

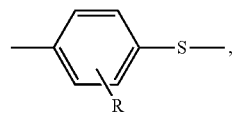

in which R is $C_1$-$C_{10}$-alkyl, preferably methyl. The polyarylene sulfides can be homopolymers, random copolymers, or block copolymers, preference being given here to homopolymers (identical repeat units). Very particularly preferred polyarylene sulfides are composed of 100% by weight of repeat units according to the general formula II. Component (B) is therefore particularly preferably a polyphenylene sulfide, in particular poly(1,4-phenylene sulfide).

End groups that can be used in the polyarylene sulfides used according to the invention are in particular halogen, thiol, or hydroxy, preferably halogen.

The polyarylene sulfides of component (B) can be branched or unbranched compounds. The polyarylene sulfides of component (B) are preferably linear, i.e. not branched.

The weight-average molar masses of the polyarylene sulfides of component (B) are preferably from 5000 to 100 000 g/mol.

The apparent melt viscosity at 350° C./1150 $s^{-1}$ of the polyarylene sulfides of component B) is preferably from 40 to 200 Pa s, with preference from 40 to 180 Pa s. Flowability was assessed on the basis of melt viscosity. Melt viscosity was determined by means of a capillary rheometer. Apparent viscosity at 350° C. was determined here as a function of shear rate in a capillary viscometer (Götffert Rheograph 2003 capillary viscometer) using a circular capillary of length 30 mm radius 0.5 mm, an inlet angle of 180° for the nozzle, a diameter of 12 mm for the melt reservoir vessel, and a preheating time of 5 minutes. The values stated were determined at 1150 Hz.

Polyarylene sulfides of this type are known per se or can be produced by known methods. Appropriate production methods are described by way of example in Hans R. Kricheldorf, "Aromatic Polyethers" in: Handbook of Polymer Synthesis, second edition, 2005, pages 486 to 492.

They can in particular, as described in U.S. Pat. No. 2,513,188, be produced via reaction of haloaromatics with sulfur or with metal sulfides. It is equally possible to heat metal salts of halogen-substituted thiophenols (see GB-B 962 941). Among the preferred syntheses of polyarylene sulfides is the reaction of alkali metal sulfides with haloaromatics in solution, for example as found in U.S. Pat. No. 3,354,129. U.S. Pat. No. 3,699,087 and U.S. Pat. No. 4,645,826 describe further processes.

COMPONENT C

The thermoplastic molding compositions of the present invention preferably comprise, as component (C), at least one, but preferably one, fibrous and/or particulate filler. The amount of the fibrous and/or particulate filler present is from 10 to 65% by weight, preferably from 15 to 65% by weight, very particularly preferably from 15 to 60% by weight, in particular from 15 to 50% by weight, where the sum of the proportions by weight of components A) to G) is 100% by weight, based on the molding composition.

The molding compositions of the invention can in particular comprise particulate or fibrous fillers, and particular preference is given here to fibrous fillers. However, component (C) comprises no graphite.

Preferred fibrous fillers are carbon fibers, potassium titanate whiskers, aramid fibers, and particularly preferably glass fibers. If glass fibers are used, these can have been equipped with a size, preferably with a polyurethane size, and with a coupling agent, to improve compatibility with the matrix material. The diameter of the carbon fibers and glass fibers used is generally in the range from 6 to 20 μm. Component (C) is therefore particularly preferably composed of glass fibers.

The form in which glass fibers are incorporated can either be that of short glass fibers or else that of continuous-filament fibers (rovings). The average length of the glass fibers in the finished injection molding is preferably in the range from 0.08 to 5 mm.

Carbon fibers or glass fibers can also be used in the form of textiles, mats, or glass-silk rovings.

Preference is given to chopped glass fibers which have been provided with a polyurethane size, or with an epoxy size or a polyester size. Particular preference is given to chopped glass fibers which have been provided with a polyurethane size, or with an epoxy size or a polyester size, in the length range from 6 to 20 μm.

Suitable particulate fillers are amorphous silica, carbonates, such as magnesium carbonate and chalk, powdered quartz, mica, various silicates, such as clays, muscovite, biotite, suzoite, tin maletite, talc, chlorite, phlogopite, feldspar, calcium silicates, such as wollastonite, or aluminum silicates, such as kaolin, particularly calcined kaolin.

Preferred particulate fillers are those in which at least 95% by weight, preferably at least 98% by weight, of the particles have a diameter (greatest diameter through the geometric center), determined on the finished product, of less than 45 μm, preferably less than 40 μm, where the value known as the aspect ratio of the particles is in the range from 1 to 25, preferably in the range from 2 to 20, determined on the finished product. The aspect ratio is the ratio of particle diameter to thickness (greatest dimension to smallest dimension, in each case through the geometric center).

The particle diameters can by way of example be determined here by recording electron micrographs of thin layers of the polymer mixture and evaluating at least 25 filler particles, preferably at least 50. The particle diameters can also be determined by way of sedimentation analysis, as in Transactions of ASAE, page 491 (1983). Sieve analysis can also be used to measure the proportion by weight of the fillers with diameter less than 40 μm.

The particulate fillers used particularly preferably comprise talc, kaolin, such as calcined kaolin, or wollastonite, or a mixture of two or all of said fillers. Among these, particular preference is given to talc having a proportion of at least 95% by weight of particles with diameter smaller than 40 μm and with aspect ratio of from 1.5 to 25, in each case determined on the finished product. Kaolin preferably has a proportion of at least 95% by weight of particles with diameter smaller than 20 μm and preferably has an aspect ratio of from 1.2 to 20, which in each case is determined on the finished product.

COMPONENT D

The molding compositions of the invention comprise, as component (D), at least one, but preferably one, elastic graphite.

The amount present of the elastic graphite is preferably from 0.5 to 20% by weight, preferably from 1 to 18% by weight, very particularly preferably from 1 to 15% by weight, in particular from 3 to 10% by weight, where the sum of the proportions by weight of components A) to G) is 100% by weight, based on the molding composition.

For the purposes of the invention, graphite is a stable hexagonal or rhombohedral crystalline form of carbon.

The elasticity of the graphite can be measured in a metal cylinder by compressing the graphite under a pressure of from 5 to 70 MPa. The height of the graphite column is measured under pressure and after removal of pressure, and the elasticity is calculated from the difference. Preference is given to products with elasticity of from 60 to 130%.

The density of the graphite is from 1.9 to 2.3.

It is preferable to use graphite with particle size of from 2 to 100 μm, in particular from 30 to 90 μm, very particularly from 30 to 70 μm.

Particle size distribution can be determined by means of laser scattering at high dilution in a suspension. An example of equipment that can be used for the measurement is Beckmann LS13320.

It is preferable to use a graphite with specific surface area of from 5 to 19 $m^2/g$, preferably from 10 to 18 $m^2/g$, particularly preferably from 14 to 18 $m^2/g$.

BET surface area can be determined to DIN ISO 9277.

Graphite is a naturally occurring raw material. The naturally occurring product can for example be comminuted in breakers or mills and can be purified by further processing steps. The purity of the product can be increased by heat treatment. Graphite can also be produced via carbonization of carbon-containing products such as coal, petroleum, or pitch.

The graphite used can by way of example be produced from coke. A first purification step is used here to reduce the concentration of volatile hydrocarbons and other impurities. Graphitization takes place in a second step, which is carried out at significantly higher temperature. The temperature used for graphitization is above 2000° C. The graphite used in the invention is preferably produced in a fluidized bed, which can provide efficient temperature control. Particular embodiments are found by way of example in U.S. Pat. No. 4,160,813 (inter alia column 5, line 28 to column 7, line 37).

COMPONENT (E)

The thermoplastic molding composition preferably comprises at least one, but preferably one, functionalized polyarylene ether comprising carboxy groups.

The amounts of component (E) present in the thermoplastic molding compositions of the invention are preferably from 0 to 20% by weight, particularly preferably from 0.1 to 15% by weight, in particular from 0.1 to 10% by weight, very particularly preferably from 2 to 8% by weight, where the sum of the proportions by weight of components A) to G) is 100% by weight, based on the molding composition.

In particular, the thermoplastic molding compositions comprise at least one functionalized polyarylene ether comprising carboxy groups with intrinsic viscosity to DIN EN ISO 1628-1 of from 40 to 65 ml/g, measured in 1% by weight solution in N-methyl-2-pyrrolidone at 25° C. The intrinsic viscosity to DIN EN ISO 1628-1 of the functionalized polyarylene ethers of component (E), measured in 1% by weight solution in N-methyl-2-pyrrolidone at 25° C., is preferably at least 46 ml/g, particularly preferably at least 47 ml/g, in particular at least 48 ml/g. Component E therefore differs from component A in particular in that component E, unlike component A, has functionalization by carboxy groups.

The use of polyarylene ethers comprising carboxy groups with intrinsic viscosity to DIN EN ISO 1628-1 of more than 65 ml/g, measured in 1% by weight solution in N-methyl-2-pyrrolidone at 25° C., generally leads to a disadvantageous reduction of flowability, without any further improvement of mechanical properties. Accordingly, there is preferably an upper limit on intrinsic viscosity to DIN EN ISO 1628-1 of the polyarylene ethers of component (E), and this is preferably at most 65 ml/g, particularly preferably at most 61 ml/g, in particular at most 57 ml/g, in each case measured in 1% by weight solution in N-methyl-2-pyrrolidone at 25° C.

Intrinsic viscosity to DIN EN ISO 1628-1 of the polyarylene ethers of component (E) can be from 30 to 65 ml/g, preferably from 35 to 65 ml/g.

The thermoplastic molding compositions of the invention preferably comprise, as component (E), at least one functionalized polyarylene ether which comprises units of the general formula I as defined for the purposes of component (A), and also units of the general formula III:

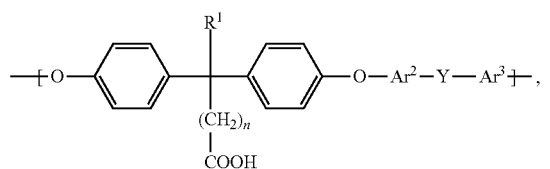

(III)

in which n is 0, 1, 2, 3, 4, 5, or 6;

$R^1$ is hydrogen, a $C_1$-$C_6$-alkyl group, or —$(CH_2)_n$—COOH;

$Ar^2$ and $Ar^3$ can be identical or different and are independently of one another a $C_6$-$C_{18}$-arylene group, and Y is a chemical bond or a group selected from —O—, —S—, —$SO_2$—, S=O, C=O, —N=N—, and —$CR^aR^b$—, where $R^a$ and $R^b$ can be identical or nonidentical, and independently of one another are in each case a hydrogen atom or a $C_1$-$C_{12}$-alkyl, $C_1$-$C_{12}$-alkoxy, or $C_6$-$C_{18}$-aryl group.

It is preferable that the proportion of units according to the general formula III, based on the entirety of the units according to formula I and formula III, is from 0.5 to 3 mol %, preferably from 0.6 to 2 mol %, with particular preference from 0.7 to 1.5 mol %.

For the purposes of the present invention, the proportion of units according to the general formula III, based on the entirety of the units according to formula I and formula III, is in principle determined by means of $^1H$ NMR spectroscopy, using a defined amount of 1,3,5-trimethoxybenzene as internal standard. The person skilled in the art knows how to convert % by weight to mol %.

For the purposes of the general formula III it is preferable that n=2 and that $R^1$=methyl, and for the purposes of the general formula III it is also preferable that $Ar^2$=$Ar^3$=1,4-phenylene, and that Y=—$SO_2$—.

The functionalized polyarylene ethers (component E) used in the molding compositions of the invention are compounds known per se or can be produced by known processes.

By way of example, the functionalized polyarylene ethers of component (E) are obtainable by a method based on EP-A-0 185 237, or else by the processes described by I. W. Parsons et al., in Polymer, 34, 2836 (1993) and T. Koch, H. Ritter, in Macromol. Phys. 195, 1709 (1994).

The polyarylene ethers are accordingly in particular obtainable via polycondensation of compounds of the general formula IV:

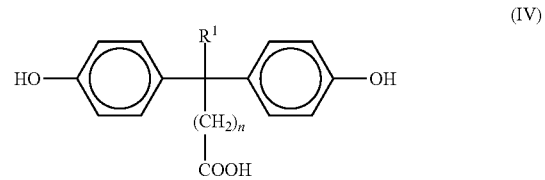

(IV)

in which $R^1$ and n are defined as above, with at least one further aromatic compound reactive toward the compounds of the general formula V, a particular example being 4,4'-dichlorodiphenyl sulfone, and optionally with further hydroxy-functionalized compounds, e.g. bisphenol A and/or bisphenol S, and/or 4,4'-dihydroxybiphenyl. Suitable reactants are well known to the person skilled in the art.

It is also in principle possible to use the methods used for polyarylene ethers of component (A) for producing the functionalized polyarylene ethers of component (E), and preference is likewise given here to the solution polymerization process in dipolar aprotic solvents with the action of base.

The statements made in relation to component (A) in respect of preferred structural elements of the general formula I apply correspondingly to the functionalized polyarylene ethers of component (E).

In particular, it is preferable that the polyarylene ethers of components (A) and (E) are structurally similar, in particular being based on the same monomer units, and differing merely in relation to the units of the general formula IV for the purposes of component (E). It is particularly preferable that both component (A) and component (E) are based on units of the PESU type as defined above, or that both component (A) and component (E) are based on units of the PPSU type as defined above, or that both component (A) and component (E) are based on units of the PSU type as defined above. "Are based on" in this context means that both component (A) and component (E) are composed of the same units, differing merely in that component (E) has additional functionalization, preferably comprising monomer units of the general formula IV as defined above. It is particularly preferable that the polyarylene ethers of component (A) and the functionalized polyarylene ethers of component (E) in each case comprise the same units of the general formula I.

For the purposes of the general formula III, a particularly suitable unit is:

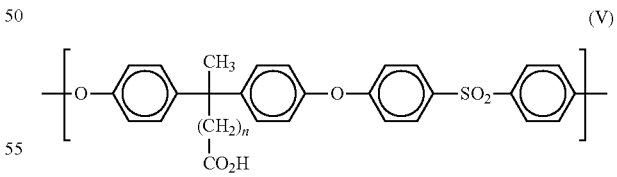

(V)

in which n is in each case an integer from 0 to 4. Unit V is very particularly preferred.

COMPONENT F

In the invention, the thermoplastic molding compositions comprise at least one, but preferably one, polyarylene ether (F) having an average of at least 1.5 phenolic end groups per polymer chain. The expression "an average" here means number average.

The amount of component (F) present in the thermoplastic molding compositions of the invention is preferably from 0 to 20% by weight, particularly preferably from 0.1 to 15% by weight, in particular from 1 to 9% by weight, very particularly preferably from 2 to 8% by weight, where the sum of the proportions by weight of components A) to G) is 100% by weight, based on the molding composition.

Without any intention of restriction, it is believed that component (F) serves as compatibilizer for components (A) to (B) because it has high content of reactive phenolic end groups.

The production of polyarylene ethers with simultaneous control of end groups is described at an earlier stage above under component (A).

It is preferable that the polyarylene ethers (F) have at least 0.15% by weight, in particular at least 0.18% by weight, particularly preferably at least 0.2% by weight, of phenolic end groups, based on the amount by weight of component (F), in each case calculated as amount by weight of OH. The average number of terminal phenolic end groups can be determined by means of titration.

The respective upper limit for the content of phenolic end groups in components (F) is a function of the number of available end groups per molecule (being two in the case of linear polyarylene ethers) and of the number-average chain length. The person skilled in the art is aware of these calculations.

To the extent that the thermoplastic molding compositions of the invention comprise a polyarylene ether (F), the ratio by weight of component (A) to component (F) is preferably from 50:1 to 2:1, in particular from 25:1 to 5:1, particularly preferably from 20:1 to 10:1.

It is preferable that the average number of phenolic end groups of component (F) per polymer chain is from 1.6 to 2, in particular from 1.7 to 2, particularly from 1.8 to 2, very particularly from 1.9 to 2. The average number of terminal phenolic end groups can be determined by means of titration.

The polyarylene ethers (A) and (F) of the present invention can—except for the end groups—be identical or be composed of different units and/or have different molecular weight, as long as they then remain completely miscible with one another.

To the extent that the thermoplastic molding compositions of the invention comprise a polyarylene ether (F), it is preferable that constituents (A) and (F) are structurally very similar, in particular are composed of the same units, and have similar molecular weight, and in particular the number-average molecular weight of one of the components is at most 30% greater than that of the other component. Polyarylene ethers are a class of polymer known to the person skilled in the art. In principle, constituent of component (F) used can comprise any of the polyarylene ethers that are known to the person skilled in the art and/or that can be produced by known methods. Appropriate methods have been explained above under component (A).

Preferred polyarylene ethers (F) are composed independently of one another of units of the general formula I (see above). Particularly preferred polyarylene ether sulfones (F) are termed polyether sulfone (PESU). Very particular preference is given to this embodiment.

The preferred polyarylene ethers (F) generally have average molar masses $M_n$ (number average) in the range from 5000 to 60 000 g/mol, and relative viscosities of from 0.20 to 0.95 dl/g. The relative viscosities of the polyarylene ethers are determined in 1% by weight N-methylpyrrolidone solution at 25° C. to DIN EN ISO 1628-1.

The polyarylene ethers (F) of the present invention preferably have weight-average molar masses $M_w$ of from 10 000 to 150 000 g/mol, in particular from 15 000 to 120 000 g/mol, particularly preferably from 18 000 to 100 000 g/mol, determined by means of gel permeation chromatography in dimethylacetamide as solvent against narrowly-distributed polymethyl methacrylate as standard.

A preferred process for producing polyarylene ethers of component (F) is described below and comprises the following steps in the sequence a-b-c:

(a) provision of at least one polyarylene ether (F*) in the presence of a solvent (S), where the content of phenolic end groups in this polyarylene ether is appropriate for the desired component (F), where the phenolic end groups thereof are present in the form of phenolate end groups, and this polyarylene ether is preferably composed of units of the general formula I as defined above, (b) addition of at least one acid, preferably of at least one polybasic carboxylic acid, and (c) obtaining the polyarylene ethers of component (F) in the form of solid.

The polyarylene ether (F*) is preferably provided here in the form of a solution in the solvent (S).

There are in principle various ways of providing the polyarylene ethers (F*) described. By way of example, an appropriate polyarylene ether (F*) can be brought directly into contact with a suitable solvent and directly used in the process of the invention, i.e. without further reaction. As an alternative, prepolymers of polyarylene ethers can be used and reacted in the presence of a solvent, whereupon the polyarylene ethers (F*) described are produced in the presence of the solvent.

However, the polyarylene ether(s) (F*) is/are preferably provided in step (a) via reaction of at least one starting compound of structure X—Ar—Y (s1) with at least one starting compound of structure HO—$Ar^1$—OH (s2) in the presence of a solvent (S) and of a base (B), where Y is a halogen atom, X is selected from halogen atoms and OH, and Ar and $Ar^1$ independently of one another are an arylene group having from 6 to 18 carbon atoms.

The ratio of (s1) and (s2) here is selected in such a way as to produce the desired content of phenolic end groups. Suitable starting compounds are known to the person skilled in the art or can be produced by known methods. Hydroquinone, resorcinol, dihydroxynaphthalene, in particular 2,7-dihydroxynaphthalene, 4,4'-dihydroxydiphenyl sulfone, bisphenol A, and 4,4'-dihydroxybiphenyl are particularly preferred as starting compound (s2).

However, it is also possible to use trifunctional compounds. In this case, branched structures are produced. If a trifunctional starting compound (s2) is used, preference is given to 1,1,1-tris(4-hydroxyphenyl)ethane.

The quantitative proportions to be used are in principle a function of the stoichiometry of the polycondensation reaction that proceeds, with cleavage of the theoretical amount of hydrogen chloride, and the person skilled in the art adjusts these in a known manner. However, an excess of (s2) is preferable, in order to increase the number of phenolic OH end groups.

In this embodiment, the molar (s2)/(s1) ratio is particularly preferably from 1.005 to 1.2, in particular from 1.01 to 1.15, and very particularly preferably from 1.02 to 1.1.

As an alternative, it is also possible to use a starting compound (s1) having X=halogen and Y=OH. In this case, an excess of hydroxy groups is achieved via addition of the starting compound (s2). In this case, the ratio of the phenolic end groups used to halogen is preferably from 1.01 to 1.2, in particular from 1.03 to 1.15, and very particularly preferably from 1.05 to 1.1.

It is preferable that the conversion in the polycondensation reaction is at least 0.9, so as to provide an adequately high molecular weight. If a prepolymer is used as precursor of the polyarylene ether, the degree of polymerization is based on the number of actual monomers.

Preferred solvents (S) are aprotic polar solvents. The boiling point of suitable solvents is moreover in the range from 80 to 320° C., in particular from 100 to 280° C., preferably from 150 to 250° C. Examples of suitable aprotic polar solvents are high-boiling ethers, esters, ketones, asymmetrically halogenated hydrocarbons, anisole, dimethylformamide, dimethyl sulfoxide, sulfolane, N-ethyl-2-pyrrolidone, and N-methyl-2-pyrrolidone.

The reaction of the starting compounds (s1) and (s2) preferably takes place in the abovementioned aprotic polar solvents (S), in particular N-methyl-2-pyrrolidone.

The person skilled in the art knows per se that the reaction of the phenolic OH groups preferably takes place in the presence of a base (B), in order to increase reactivity with respect to the halogen substituents of the starting compound (s1).

It is preferable that the bases (B) are anhydrous. Particularly suitable bases are anhydrous alkali metal carbonate, preferably sodium carbonate, potassium carbonate, calcium carbonate, or a mixture thereof, and very particular preference is given here to potassium carbonate.

A particularly preferred combination is N-methyl-2-pyrrolidone as solvent (S) and potassium carbonate as base (B).

The reaction of the suitable starting compounds (s1) and (s2) is carried out at a temperature of from 80 to 250° C., preferably from 100 to 220° C., and the boiling point of the solvent provides an upper restriction on the temperature here. The reaction preferably takes place within a period of from 2 to 12 h, in particular from 3 to 8 h.

It has proven advantageous, after step (a) and prior to conduct of step (b), to filter the polymer solution. This removes the salt formed during the polycondensation reaction, and also any gel that may have formed.

It has also proven advantageous for the purposes of step (a) to adjust the amount of the polyarylene ether (F*), based on the total weight of the mixture of polyarylene ether (F*) and solvent (S), to from 10 to 70% by weight, preferably from 15 to 50% by weight.

For the purposes of step (b), at least one acid is added, preferably at least one polybasic carboxylic acid, to the polyarylene ether (F*) from step (a), preferably to the solution of the polyarylene ether (F*) in the solvent (S).

It is also possible to add at least one polybasic carboxylic acid to the precipitant.

"Polybasic" means a basicity of at least 2. The basicity is the (optionally average) number of COOH groups per molecule. Polybasic means basicity of two or higher. For the purposes of the present invention, preferred carboxylic acids are dibasic and tribasic carboxylic acids.

The polybasic carboxylic acid can be added in various ways, in particular in solid or liquid form or in the form of a solution, preferably in a solvent miscible with the solvent (S).

The number-average molar mass of the polybasic carboxylic acid is preferably at most 1500 g/mol, in particular at most 1200 g/mol. At the same time, the number-average molar mass of the polybasic carboxylic acid is preferably at least 90 g/mol.

Particularly suitable polybasic carboxylic acids are those according to the general structure VI:

HOOC—R—COOH     (VI), where R represents a hydrocarbon moiety having from 2 to 20 carbon atoms and optionally comprising further functional groups, preferably selected from OH and COOH.

Preferred polybasic carboxylic acids are $C_4$-$C_{10}$ dicarboxylic acids, in particular succinic acid, glutaric acid, adipic acid, and tricarboxylic acids, in particular citric acid. Particularly preferred polybasic carboxylic acids are succinic acid and citric acid.

In order to provide adequate conversion of the phenolate end groups to phenolic end groups, it has proven advantageous to adjust the amount of the polybasic carboxylic acid(s) used in respect of the amount of the phenolate end groups.

For the purposes of step (b) it is preferable to add a polybasic carboxylic acid so that the amount of carboxy groups is from 25 to 200 mol %, preferably from 50 to 150 mol %, particularly preferably from 75 to 125 mol %, based on the molar amount of phenolic end groups.

If the amount of acid added is too small, the precipitation properties of the polymer solution are inadequate, while any markedly excessive addition can cause discoloration of the product during further processing.

For the purposes of step (c), the polyarylene ether (F) is obtained in the form of solid. In principle, various processes can be used for obtaining the material in the form of solid. However, it is preferable to obtain the polymer composition via precipitation.

The preferred precipitation process can in particular take place via mixing of the solvent (S) with a poor solvent (S'). A poor solvent is a solvent in which the polymer composition is not soluble. This poor solvent is preferably a mixture of a non-solvent and a solvent. A preferred non-solvent is water. A preferred mixture (S') of a solvent with a non-solvent is preferably a mixture of the solvent (S), in particular N-methyl-4-pyrrolidone, and water. It is preferable that the polymer solution from step (b) is added to the poor solvent (S'), the result being precipitation of the polymer composition. It is preferable here to use an excess of the poor solvent. It is particularly preferable that the polymer solution from step (a) is added in finely dispersed form, in particular in droplet form.

If the poor solvent (S') used comprises a mixture of the solvent (S), in particular N-methyl-2-pyrrolidone, and of a non-solvent, in particular water, a preferred solvent:non-solvent mixing ratio is then from 1:2 to 1:100, in particular from 1:3 to 1:50.

A mixture of water and N-methyl-2-pyrrolidone (NMP) in combination with N-methyl-2-pyrrolidone as solvent (S) is preferred as poor solvent (S'). An NMP/water mixture in the ratio of from 1:3 to 1:50, in particular 1:30, is particularly preferred as poor solvent (S').

The precipitation is particularly efficient if the content of polymer composition in the solvent (S), based on the total weight of the mixture made of polymer composition and solvent (S), is from 10 to 50% by weight, preferably from 15 to 35% by weight.

The potassium content of component (F) is preferably at most 600 ppm. Potassium content is determined by means of atomic spectroscopy.

COMPONENT G

The molding compositions of the invention can comprise component (G) auxiliaries, in particular processing aids, pigments, stabilizers, flame retardants, or a mixture of different additives. Examples of other conventional additives are oxidation retardants, agents to counteract decomposition by heat and decomposition by ultraviolet light, lubricants and mold-release agents, dyes, and plasticizers. However component (G) comprises no graphite.

The proportion of component (G) in the molding composition of the invention is in particular from 0 to 40% by weight, preferably from 0 to 30% by weight, in particular from 0 to 20% by weight, based on the total weight of components (A) to (G). If component (G) includes stabilizers, the proportion of said stabilizers is usually up to 2% by weight, preferably from 0.01 to 1% by weight, in particular from 0.01 to 0.5% by weight, where the sum of the proportions by weight of components A) to G) is 100% by weight, based on the molding composition.

The amounts generally comprised of pigments and dyes are from 0 to 6% by weight, preferably from 0.05 to 5% by weight, and in particular from 0.1 to 3% by weight, based on the total of the % by weight values for components (A) to (G).

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [$2PbCO_3 \cdot Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinell black [$Cu(Cr, Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are known to the person skilled in the art.

Examples of oxidation retarders and heat stabilizers which can be added to the thermoplastic molding compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, optionally in combination with phosphorus-containing acids, or to use their salts, or a mixture of said compounds, preferably in concentrations up to 1% by weight, based on the total of the % by weight values for components (A) to (G).

Examples of UV stabilizers are various substituted resorcinols, salicylates, benzotriazoles, and benzophenones, the amounts generally used of these being up to 2% by weight.

Lubricants and mold-release agents, the amounts of which added are generally up to 1% by weight, based on the total of the % by weight values for components (A) to (G), are stearyl alcohol, alkyl stearates, and stearamides, and also esters of pentaerythritol with long-chain fatty acids. It is also possible to use dialkyl ketones, such as distearyl ketone.

It is preferable that the molding compositions of the invention comprise from 0.1 to 2% by weight, preferably from 0.1 to 1.75% by weight, particularly from 0.1 to 1.5% by weight and in particular from 0.1 to 0.9% by weight (based on the sum of the % by weight values of components (A) to (G)) of stearic acid and/or of stearates. In principle it is also possible to use other stearic acid derivatives, for example esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference is given to products with more than 20% by weight content of stearic acid, particularly preferably more than 25% by weight. It is also possible to use pure stearic acid (>98%).

Component (G) can moreover also include stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

Further additives that can be used are also those known as nucleating agents, an example being talc powder.

Production of the Molding Composition

Components (A) to (G) can be mixed in any desired sequence.

The molding compositions of the invention can be produced by processes known per se, for example extrusion. The molding compositions of the invention can by way of example be produced by mixing the starting components in conventional mixing apparatuses, such as screw-based extruders, preferably twin-screw extruders, Brabender mixers, or Banbury mixers, or else kneaders, and then extruding them. The extrudate is cooled and comminuted. The sequence of the mixing of the components can be varied, and it is therefore possible to mix two or more than two components in advance, but it is also possible to mix all of the components together.

In order to obtain a mixture with maximum homogeneity, intensive and thorough mixing is advantageous. Average mixing times needed for this are generally from 0.2 to 30 minutes at temperatures of from 290 to 380° C., preferably from 300 to 370° C. The extrudate is generally cooled and comminuted.

Examples of typical molding compositions of the invention can be found in the table below.

| Molding composition | A | B | C | D | E | F | G |
|---|---|---|---|---|---|---|---|
| 1 | 40 | 15 | 40 | 5 | — | — | — |
| 2 | 35 | 20 | 40 | 5 | — | — | — |
| 3 | 30 | 25 | 40 | 5 | — | — | — |
| 4 | 25 | 30 | 40 | 5 | — | — | — |
| 5 | 50 | 8 | 37 | 5 | — | — | — |
| 6 | 30 | 20 | 40 | 5 | 5 | — | — |
| 7 | 30 | 20 | 40 | 5 | — | 5 | — |
| 8 | 30 | 20 | 40 | 5 | 2.5 | 2.5 | — |
| 9 | 35 | 20 | 42.5 | 2.5 | — | — | — |
| 10 | 35 | 20 | 37.5 | 7.5 | — | — | — |

| Molding composition | Ex. 1 in % by wt. | Ex. 2 in % by wt. | Ex. 3 in % by wt. | Ex. 4 in % by wt. |
|---|---|---|---|---|
| A: Polyether sulfone, melt viscosity from 200 to 280 Pa s | 10-50 | 14-45 | 20-45 | 30-45 |
| B: Polyphenylene sulfide, melt viscosity from 60 to 100 Pa s | 5-44.5 | 5-30 | 5-20 | 10-20 |
| C: Chopped glass fibers, staple length from 2 to 4.5 mm | 10-65 | 15-65 | 15-60 | 15-50 |
| D: Graphite, elasticity from 70 to 120%, spec. surface area from 10 to 18% | 0.5-20 | 1-18 | 1-15 | 3-10 |
| E: Polyether sulfone, intrinsic viscosity at least 46 ml/g | 0-20 | 0.1-15 | 0.1-10 | 2-8 |
| F: Polyether sulfone, $M_w$ from 18 000 to 100 000 g/mol | 0-20 | 0.1-15 | 1-9 | 2-8 |

Uses

The thermoplastic molding compositions of the invention can be used advantageously for producing fibers, foils, foams, or moldings. The thermoplastic molding compositions of the invention are particularly suitable for producing moldings for household items, or for electrical or electronic components, and also for producing moldings for the vehicle sector, in particular automobiles.

The mechanical properties of the thermoplastic molding composition of the invention favor the use of the thermoplastic molding composition for producing fibers, foils, and/or moldings. The thermoplastic composition is in particular suitable for producing specific moldings in vehicles and construction of equipment, for example for industrial purposes or for consumer-related purposes. The thermoplastic molding composition can therefore be used for producing electronic components, housings, housing components, protective cover flaps and other protective covers, damping elements, springs, grips, charge-air pipes, air ducts, air-inlet grilles, or valve components.

The examples below illustrate, but do not restrict, the invention.

ISO Standards

DIN ISO 527: Plastics—Determination of tensile properties—Part 1: General principles (ISO 527-1:1993 inclusive of Corr 1: 1994); German version EN ISO 527-1:1996

DIN ISO 179: Plastics—Determination of Charpy impact properties—Part 2: Instrumented impact test (ISO 179-2: 1997); German version EN ISO 179:1999.

DIN EN ISO 1628-1: Plastics—Determination of the viscosity of polymers in dilute solution using capillary viscometers—Part 1: General principles (ISO 1628-1:2009); German version EN ISO 1628-1:2009

DIN EN ISO 1043-1: Plastics—Symbols and abbreviated terms—Part 1: Basic polymers and their special characteristics (ISO 1043-1:2001); German version EN ISO 1043-1: 2002.

DIN ISO 9277: Determination of the specific surface area of solids by gas adsorption using the BET method (ISO 9277: 1995).

General Comments

The moduli of elasticity, ultimate tensile strength, and tensile strain at break of the specimens were determined on dumbbell specimens in the DIN ISO 527 tensile test.

The impact resistance of the products comprising glass fibers was determined on ISO specimens to DIN ISO 179 1eU.

Melt viscosity was determined by means of a capillary rheometer. Apparent viscosity at 380° C. was determined here as a function of shear rate in a capillary viscometer (Göttfert Rheograph 2003 capillary viscometer) using a circular capillary of length 30 mm radius 0.5 mm, an inlet angle of 180° for the nozzle, a diameter of 12 mm for the melt reservoir vessel, and a preheating time of 5 minutes. The values stated were determined at 1000 Hz. Measurement was continued for 1 hour. The value stated is the quotient calculated from a value measured after 1 hour and the initial value.

The intrinsic viscosity of the polyarylene ethers was determined in 1% solution in N-methylpyrrolidone at 25° C. to DIN EN ISO 1628-1.

The elasticity of the graphite was measured in a metal cylinder, by compressing the graphite under a pressure of from 5 to 70 MPa. The height of the graphite column was measured under pressure and after removal of pressure, and this was used to calculate the elasticity (see above).

Particle size distribution was determined by means of laser scattering at high dilution in a suspension. The equipment used for the measurement was Beckmann LS13320.

BET surface area was determined to DIN ISO 9277.

COMPONENT A

A polyether sulfone with intrinsic viscosity of 49.0 ml/g (Ultrason® E 1010 from BASF SE) was used as component A. The product used had 0.19% by weight of Cl end groups and 0.23% by weight of $OCH_3$ end groups. Apparent melt viscosity determined at 350° C./1150 $s^{-1}$ is 263 Pa s.

COMPONENT B

A polyphenylene sulfide with melt viscosity of 76 Pa s at 350° C. and shear rate of 1150 $s^{-1}$ was used as component B.

COMPONENT C

Chopped glass fibers with staple length of 4.5 mm and fiber diameter of 10 μm, provided with a polyurethane size, were used as component C.

COMPONENT D1

Component D1 used comprised a graphite with elasticity of 90%, with 95% of particles measuring less than 50 μm and with specific surface area of 16.1 $m^2/g$. The d50 particle size value is: 9 μm.

COMPONENT D2

Component D2 used comprised a graphite with elasticity of 30%, with 95% of particles measuring less than 40 μm and with specific surface area of 20.6 $m^2/g$. The d50 particle size value is: 9.5 μm.

COMPONENT E

A polyether sulfone produced as follows was used as component E: 577.03 g of dichlorodiphenyl sulfone, 495.34 g of dihydroxydiphenyl sulfone, and 5.73 g of 4,4'-bishydroxyphenylvaleric acid were dissolved in 1053 ml of NMP under nitrogen, and 297.15 g of anhydrous potassium carbonate were admixed. The reaction mixture was heated to 190° C. and kept at this temperature for 6 h. The mixture was then diluted with 1947 ml of NMP. After cooling to T<80° C., the suspension was discharged. Filtration was then used to remove the insoluble constituents. The resultant solution was then precipitated in water. The resultant white powder was then repeatedly extracted with hot water and then dried in vacuo at 140° C. The proportion of DPA units was determined as 0.9 mol %, and the intrinsic viscosity of the product was 46.9 ml/g.

COMPONENT F

Component F used comprised a polyether sulfone with intrinsic viscosity of 55.6 ml/g which had 0.20% by weight of OH end groups and 0.02% by weight of Cl end groups.

COMPONENT X

Component X used comprised an ethylene-methyl methacrylate-glycidyl methacrylate terpolymer of composition 67/25/8 (in % by weight) with MFI of 6 g/10 min (190° C./2.16 kg) (Lotader AX8900 rubber).

Test results

| | \multicolumn{12}{c}{Example} | | | | | | | | | | | |
|---|---|---|---|---|---|---|---|---|---|---|---|---|
| | c1 | 2 | 3 | c4 | c5 | 6 | c7 | 8 | c9 | c10 | 11 | c12 |
| Component | | | | | | | | | | | | |
| A | 41 | 41 | 41 | 41 | 36 | 36 | 36 | 36 | 55 | 55 | 55 | 66 |
| B | 14 | 14 | 14 | 14 | 14 | 14 | 14 | 14 | 20 | 20 | 20 | 19 |
| C | 45 | 42 | 40 | 40 | 45 | 42 | 42 | 42 | 20 | 17 | 17 | — |
| D1 | — | 3 | 5 | — | — | 3 | — | 3 | — | — | 3 | — |
| D2 | — | — | — | 5 | — | — | 3 | — | — | 3 | — | — |
| E | — | — | — | — | 5 | 5 | — | — | 5 | 5 | 5 | 10 |
| F | — | — | — | — | — | — | 5 | 5 | — | — | — | — |
| X | — | — | — | — | — | — | — | — | — | — | — | 5 |
| Properties | | | | | | | | | | | | |
| Modulus of elasticity [GPa] | 16.5 | 16.3 | 16.1 | 16.2 | 16.5 | 16.3 | 16.2 | 16.4 | 7.2 | 7.1 | 7.1 | 2.5 |
| Tensile strain at break [%] | 1.4 | 1.4 | 1.4 | 1.2 | 1.9 | 1.8 | 1.5 | 1.5 | 2.1 | 2.1 | 2.2 | 24 |
| Ultimate tensile strength [MPa] | 148 | 146 | 143 | 134 | 161 | 156 | 143 | 150 | 112 | 110 | 113 | 72 |
| ISO 179 1eU [kJ/m$^2$] | 42 | 42 | 40 | 33 | 52 | 48 | 38 | 43 | 112 | 110 | 113 | 72 |
| Melt stability at 380° C. | >100 | 5.4 | 3.3 | 6.5 | >100 | 5.3 | 8.7 | 4.3 | >20 | 9.2 | 3.1 | >20 |

The invention claimed is:

1. A thermoplastic molding composition comprising
   A) from 10 to 50% by weight of at least one polyarylene ether having an average of at most 0.5 phenolic end groups per polymer chain and having no carboxy groups,
   B) from 5 to 44.5% by weight of at least one polyphenylene sulfide,
   C) from 10 to 65% by weight of at least one fibrous and/or particulate filler, wherein C) comprises no graphite,
   D) from 0.5 to 20% by weight of an elastic graphite having an elasticity of from 60 to 130% as measured in a metal cylinder by compressing the graphite under a pressure from 5 to 70 MPa, measuring a first height, removing the pressure, measuring a second height after removing the pressure, and calculating the elasticity from the difference between the first height and the second height,
   E) from 0 to 20% by weight of at least one polyarylene ether comprising carboxy groups,
   F) from 0 to 20% by weight of at least one polyarylene ether having an average of at least 1.5 phenolic end groups per polymer chain and having no carboxy groups, and
   G) from 0 to 40% by weight of at least one additive that comprises no graphite,
   where the sum of the proportions by weight of components A) to G) does not exceed 100% by weight, based on the molding composition.

2. The thermoplastic molding composition according to claim 1, wherein the apparent melt viscosity at 350° C./1150 s$^{-1}$ of the polyarylene ether A) is from 150 to 300 Pa s.

3. The thermoplastic molding composition according to claim 1, wherein the intrinsic viscosity of the polyarylene ether A) is from 0.20 to 0.95 dl/g, measured to DIN EN ISO 1628-1.

4. The thermoplastic molding composition according to claim 1, wherein the polyarylene ether A) used comprises a polyarylene ether sulfone having an average of at most 0.5 phenolic end groups per polymer chain and having no carboxy groups.

5. The thermoplastic molding composition according to claim 1, wherein the apparent melt viscosity at 350° C./1150 s$^{-1}$ of the polyphenylene sulfide B) is from 40 to 200 Pa s.

6. The thermoplastic molding composition according to claim 1, wherein glass fibers are used as component C).

7. The thermoplastic molding composition according to claim 1, wherein a graphite with d50 particle size of less than 20 μm is used as component D).

8. The thermoplastic molding composition according to claim 1, wherein a graphite comprising exclusively particles measuring less than 100 μm is used as component D).

9. The thermoplastic molding composition according to claim 1, wherein a polyarylene ether sulfone comprising carboxy groups is used as polyarylene ether E).

10. The thermoplastic molding composition according to claim 1, wherein the intrinsic viscosity of the polyarylene ether E) is from 40 to 65 ml/g, measured to DIN EN ISO 1628-1.

11. The thermoplastic molding composition according to claim 1, wherein the polyarylene ether F) used comprises a polyarylene ether sulfone having an average of at least 1.5 phenolic end groups per polymer chain and having no carboxy groups.

12. A process for producing fibers, foils, or moldings which comprises utilizing the thermoplastic molding composition according to claim 1.

13. A fiber, foil, or molding comprising a thermoplastic molding composition according to claim 1.

* * * * *